United States Patent
Shriram

(10) Patent No.: US 11,416,890 B2
(45) Date of Patent: Aug. 16, 2022

(54) SYSTEMS, METHODS AND PROGRAMMED PRODUCTS FOR DYNAMICALLY CAPTURING, OPTIMIZING AND DISPLAYING CONTENT ON PUBLIC AND SEMIPUBLIC DIGITAL DISPLAYS

(71) Applicant: Intersection Media, LLC, New York, NY (US)

(72) Inventor: Nitin Shriram, Edison, NJ (US)

(73) Assignee: Intersection Media, LLC, New York, NY (US)

( * ) Notice: Subject to any disclaimer, the term of this patent is extended or adjusted under 35 U.S.C. 154(b) by 0 days.

(21) Appl. No.: 17/303,239

(22) Filed: May 25, 2021

(65) Prior Publication Data
US 2021/0374800 A1    Dec. 2, 2021

Related U.S. Application Data

(60) Provisional application No. 63/030,794, filed on May 27, 2020.

(51) Int. Cl.
| | | |
|---|---|---|
| G06Q 30/00 | (2012.01) | |
| G06Q 30/02 | (2012.01) | |
| G09F 27/00 | (2006.01) | |
| G06F 16/2457 | (2019.01) | |
| G09F 9/30 | (2006.01) | |
| G06F 16/29 | (2019.01) | |

(52) U.S. Cl.
CPC ... *G06Q 30/0252* (2013.01); *G06F 16/24575* (2019.01); *G06F 16/29* (2019.01); *G06Q 30/0264* (2013.01); *G09F 9/30* (2013.01); *G09F 27/004* (2013.01)

(58) Field of Classification Search
None
See application file for complete search history.

(56) References Cited

U.S. PATENT DOCUMENTS

| | | | | |
|---|---|---|---|---|
| 2002/0052933 | A1* | 5/2002 | Leonhard | G06Q 30/06 709/219 |
| 2011/0141974 | A1* | 6/2011 | Lieberman | H04W 4/12 370/328 |
| 2015/0169776 | A1* | 6/2015 | Sheinfeld | G06Q 10/1093 707/769 |
| 2017/0064412 | A1* | 3/2017 | Taxier | H04L 67/12 |

OTHER PUBLICATIONS

Digital Signage Displays—Captivate Office Lobby & Elevator Advertising, https://www.captivate.com/ (Internet), accessed Aug. 11, 2021.

\* cited by examiner

*Primary Examiner* — Matthew T Sittner
(74) *Attorney, Agent, or Firm* — Amster, Rothstein & Ebenstein LLP

(57) ABSTRACT

A system and method for dynamically tracking and capturing content and displaying the content on public or semi-public non-personal digital displays. In exemplary embodiments, the content may include an urgent notification that is displayed within a slot of looped content with the manner in which the urgent notification is displayed depending on the level of urgency and attributes of the non-personal digital displays.

16 Claims, 17 Drawing Sheets

```
[
    {
        "id": 24918,
        "attribute": {
            "id": 7,
            "transit_mode": 1,
            "label": "Jackson (Blue)",
            "tag_label": "Jackson (Blue)",
            "tag_color": "#ccc",
            "tag_text_color": "#000",
            "stop_code": "40070",
            "latitude": "41.878183",
            "longitude": "-87.629296",
            "accessibility": true,
            "organization": 1
        },
        "display_count": 8,
        "attribute_type": "STATION",
        "attribute_id": 7,
        "targeted_object_type": "DISPLAYS",
        "targeted_object_id": 105
    },
    {
        "id": 28234,
        "attribute": {
            "id": 52,
            "transit_mode": 1,
            "label": "Jackson (Red)",
            "tag_label": "Jackson (Red)",
            "tag_color": "#ccc",
            "tag_text_color": "#000",
            "stop_code": "40560",
            "latitude": "41.878153",
            "longitude": "-87.627596",
            "accessibility": true,
            "organization": 1
        },
        "display_count": 8,
        "attribute_type": "STATION",
        "attribute_id": 52,
        "targeted_object_type": "DISPLAYS",
        "targeted_object_id": 105
    }
]
```

FIG. 10

```
[
    {
        "id": 1497793,
        "attribute": {
            "id": 131,
            "transit_mode_type": "SUBWAY",
            "label": "Blue Line",
            "route_code": "Blue",
            "tag_label": "Blue Line",
            "tag_color": "00A1DE",
            "tag_text_color": "FFFFFF",
            "transit_mode": 1
        },
        "display_count": 92,
        "attribute_type": "ROUTE",
        "attribute_id": 131,
        "targeted_object_type": "ALERTS",
        "targeted_object_id": 870559
    },
    {
        "id": 1497792,
        "attribute": {
            "id": 123,
            "transit_mode": 1,
            "label": "Montrose (Blue)",
            "tag_label": "Montrose (Blue)",
            "tag_color": "#ccc",
            "tag_text_color": "#000",
            "stop_code": "41330",
            "latitude": "41.960901",
            "longitude": "-87.742903",
            "accessibility": false,
            "organization": 1
        },
        "display_count": 0,
        "attribute_type": "STATION",
        "attribute_id": 123,
        "targeted_object_type": "ALERTS",
        "targeted_object_id": 870559
    }
]
```

FIG. 11

```
[
    {
        "id": 257812,
        "attribute": {
            "id": 1,
            "label": "SUBWAY",
            "tag_label": "SUBWAY",
            "tag_color": "Red",
            "tag_text_color": "#000",
            "mode_type": "SUBWAY",
            "namespace_key": null,
            "organization": 1
        },
        "display_count": 414,
        "attribute_type": "MODE",
        "attribute_id": 1,
        "targeted_object_type": "CONTENT",
        "targeted_object_id": 54
    },
    {
        "id": 257813,
        "attribute": {
            "id": 2,
            "label": "BUS",
            "tag_label": "BUS",
            "tag_color": "Blue",
            "tag_text_color": "#fff",
            "mode_type": "BUS",
            "namespace_key": null,
            "organization": 1
        },
        "display_count": 99,
        "attribute_type": "MODE",
        "attribute_id": 2,
        "targeted_object_type": "CONTENT",
        "targeted_object_id": 54
    }
]
```

FIG. 12

```
{
    "alerts": [
        870559,
        870736,
        873628,
        876544
    ],
    "content": [
        5,
        1061,
        53,
        54,
        573,
        574,
        1003
    ],
    "stops": [
        10968,
        10969,
        11059,
        11060
    ],
    "modes": [
        1
    ],
    "routes": [
        128,
        131
    ],
    "stations": [
        7,
        52
    ],
    "maps": [
        35,
        36,
        37,
        11
    ],
    "configuration": {
        "navigation": {
            "train_map": true,
            "area_map": false,
            "sightseeing_map": true,
            "train_arrivals": true,
            "bus_arrivals": true,
            "rail_arrivals": false,
            "rail_alerts": false,
            "train_alerts": true,
            "bus_alerts": true
        },
        "timeout": 15000
    },
    "tags": []
}
```

FIG. 13

```
{ "items": [ { "filter": { "page_type": "INIT2", "screen_profile": "NOWOP",
"flight_number": "1", "destination": "JFK", "scheduled_departure": "1939-07-
02T07:42:19.1842", "subfleet": "B7F", "meal_code": "D", "pde_available": "Y",
"display_id": "display1", "carrier_code": "UA", "estimated_departure": "1954-06-
06T09:43:26.7242" }, "id": "item1" }, { "filter": { "page_type": "OPS2",
"screen_profile": "BOARDING", "flight_number": "0679", "destination": "ZRH",
"scheduled_departure": "1945-03-18T15:46:14.0682", "subfleet": "B7F", "meal_code": "",
"G", "pde_available": "N", "display_id": "display2", "carrier_code": "UA",
"estimated_departure": "1974-02-28T07:31:48.4972" }, "id": "item2" }, { "filter": {
"page_type": "OPS4", "screen_profile": "NOWOP", "flight_number": "432", "destination":
"LAX", "scheduled_departure": "2008-08-24T03:55:52.5142", "subfleet": "B7F",
"meal_code": "G", "pde_available": "Y", "display_id": "display3", "carrier_code":
"UA", "estimated_departure": "2016-02-21T10:17:42.1782" }, "id": "item3" }], "id":
"request1" }
```

FIG. 14

{ "items": [ { "content": 1, "request_item_id": "item1", "pop_url": "http://.../pop?request_id=request1&request_item_id=item1&content=1&time=<utc timestamp e.g 2018-05-24T00:21:42.544Z>" }, { "content": 2, "request_item_id": "item2", "pop_url": "http://.../pop?request_id=request1&request_item_id=item2&content=2&time=<utc timestamp e.g 2018-05-24T00:21:42.544Z>" }, { "content": null, "request_item_id": "item3", "pop_url": null } ], "request_id": "request1" }

FIG. 15

SYSTEMS, METHODS AND PROGRAMMED PRODUCTS FOR DYNAMICALLY CAPTURING, OPTIMIZING AND DISPLAYING CONTENT ON PUBLIC AND SEMIPUBLIC DIGITAL DISPLAYS

CROSS-REFERENCE TO RELATED APPLICATIONS

This application claims the benefit of and priority to U.S. Provisional Patent Application No. 63/030,794, entitled SYSTEMS, METHODS AND PROGRAMMED PRODUCTS FOR DYNAMICALLY CAPTURING, OPTIMIZING AND DISPLAYING CONTENT ON PUBLIC AND SEMI-PUBLIC DIGITAL DISPLAYS, filed on May 27, 2020, the contents of which are incorporated herein by reference in their entirety.

FIELD

The present invention generally relates to systems and methods for dynamically capturing, optimizing and displaying content on public and semi-public non-personal digital displays. In embodiments, the present invention generally relates to systems and methods for capturing and analyzing content so that the content is displayed on public or semi-public non-personal digital displays in an optimized manner based on attributes of the content and/or attributes of the non-personal digital displays.

BACKGROUND

Digital out-of-home media, or DOOH media, refers to digital media that appears in environments accessible to the public or in semi-public settings. This includes digital billboards and outdoor signage, as well as networks of screens found in businesses like malls and healthcare providers. Examples of locations at which DOOH media may be displayed include: shopping malls and retail stores, movie theaters and arenas, medical waiting rooms, airports, train stations and bus shelters, beside major roadways, and within elevators, to name a few. DOOH media provide some important advantages over static forms of outdoor advertising, such as reduced management costs, more varied content, increased campaign creativity, and allowing for integration with other technologies such as display and facial recognition technology.

DOOH media typically plays on a loop, with much of the same material recurring after a set amount of time, such as every 8 to 10 seconds, to name a few. Conventional DOOH media algorithms involve establishing a pre-defined loop made up of slots, with each slot pre-set for a specific buyer and/or content type. To reach more people, buyers often purchase multiple slots within a single loop. As an example, a first slot within a loop may include a first programmatic advertisement, a second slot may include a public service announcement, a third slot may include a second programmatic advertisement, and a fourth slot may include a news item. The screen may be divided in that it includes designated areas for display of differing types of content, such as, for example, one area for public service advertisements and/or news items and a second area for display of advertising. In all cases, prior to displaying content, the conventional DOOH media algorithm requires the network manager to input information regarding a pre-set loop that repeats within a specific time frame, with slots already filled up within the loop. Thus, the displayed content is static in the sense that loop content does not change until the network manager inputs another loop and associated slot content, and not capable of changing dynamically in real-time.

Due to the pre-set loop and slot content, conventional DOOH media algorithms present technological barriers to real-time monitoring of information and dynamically displaying content based on the monitored information. These barriers do not allow for real-time decision making for determining what to display within each slot, and thus do not allow for dynamic display opportunities, such as, for example, capturing and display of emergency broadcasts and other urgent content in real-time. Conventional DOOH networks lack the ability to dynamically and automatically configure the slot content shown in different time slots in a loop.

What is needed is a system and method by which DOOH networks can dynamically monitor, capture and display content in real-time.

SUMMARY

The present invention addresses this and other problems with new and improved computer systems and methods for dynamically capturing and analyzing information and displaying the information on public or semi-public non-personal digital displays so that such information may be made available to viewers of the displays in real-time or near real-time while optimizing the accessibility and effectiveness of the display of such information based on attributes of the non-personal digital displays.

A method according to an exemplary embodiment of the present invention comprises: receiving or obtaining, at one or more computers, a notification of an event, the notification comprising event information data; analyzing, by the one or more computers, the notification to determine event metadata based on the event information data, the analyzing step comprising: extracting, by the one or more computers, the event information data from the notification; analyzing, by the one or more computers, the event information data to determine one or more event attributes, the event attributes comprising at least a severity attribute; and generating, by the one or more computers, the event metadata corresponding to the event attributes; storing, by the one or more computers, the event metadata in a first database; receiving or obtaining, at the one or more computers, display data corresponding to one or more non-personal digital displays; analyzing, by the one or more computers, the display data to determine display metadata corresponding to the one or more non-personal digital displays, the step of analyzing comprising at least one of: parsing, by the one or more computers, a third-party asset management database to determine one or more display attributes; referencing, by the one or more computers, one or more tags disposed at the one or more non-personal digital displays to determine one or more display attributes; and generating, by the one or more computers, the display metadata based on the one or more display attributes; storing, by the one or more computers, the display metadata in a second database; selecting, by the one or more computers, at least one non-personal digital display for display of the event notification data, the step of selecting comprising: comparing, by the one or more computers, the display metadata with the event metadata; and selecting, by the one or more computers, for display of the event notification data, based on the comparison, at least one non-personal digital display with corresponding display attributes associated with display metadata that at least partially match with the event metadata; generating, by the one or more computers, event display rules associated with display of the event notification data at the selected at least one non-personal digital display; generating, by the one or more computers, display rules associated with display of content on the one or more non-personal digital displays, the display rules comprising at least the event display rules; determining, by the one or more computers, based on the event display rules, content to be displayed at each of the one or more non-personal digital displays; and generating, by the one or more computers, instructions for display of the content at each of the one or more non-personal digital displays based on the event display rules.

In accordance with exemplary embodiments, the content is looped content, and display of the event information data occurs within a slot within the looped content.

In accordance with exemplary embodiments, the looped content further comprises an advertising slot.

In accordance with exemplary embodiments, the advertising slot comprises programmatic advertising.

In accordance with exemplary embodiments, the steps of the process are performed on a periodic basis.

In accordance with exemplary embodiments, the periodic basis is less than 5 seconds.

In accordance with exemplary embodiments, the step of receiving or obtaining a notification of an event comprises integrating with a third-party data provider.

In accordance with exemplary embodiments, the step of integrating comprises accessing the third-party data provider though an application programming interface.

In accordance with exemplary embodiments, the one or more event attributes further comprises at least one of an event location attribute and an event time attribute.

In accordance with exemplary embodiments, the first database is a structured database.

In accordance with exemplary embodiments, the one or more non-personal digital displays are in a common network.

In accordance with exemplary embodiments, the one or more display attributes comprises at least one of a display location attribute and a physical display attribute.

In accordance with exemplary embodiments, the second database is a structured database.

In accordance with exemplary embodiments, the event display rules comprise one or more of the following: what event notification data should be displayed on one or more screens of the one or more non-personal digital displays; which non-personal digital displays should the event be displayed on; when should the event notification data be displayed; and at what frequency should the event notification data be displayed.

In accordance with exemplary embodiments, the step of generating, by the one or more computers, display rules associated with display of content on the one or more non-personal digital displays comprises at least one of receiving or obtaining display rules from a third-party source computer system.

In accordance with exemplary embodiments, the third-party source computer system is an advertising server.

In accordance with exemplary embodiments, the third-party source computer system is third-party programmatic platform.

DESCRIPTION OF THE DRAWINGS

Exemplary embodiments of the present invention will be described with references to the accompanying figures, wherein:

FIG. 10 shows computer code resulting in tagging of a display object with two attributes (stations) in accordance with exemplary embodiments of the present invention;

FIG. 11 shows computer code resulting in tagging of an event object with two attributes (a station and a route) in accordance with exemplary embodiments of the present invention;

FIG. 12 shows computer code resulting in tagging of a content object with two transportation type modes (bus and subway) in accordance with exemplary embodiments of the present invention;

FIG. 13 shows computer code that associates with corresponding displays different alert (event) ids, content ids, stop ids, route ids, mode ids, station ids, and map ids in accordance with exemplary embodiments of the present invention;

FIG. 14 shows computer code that requests generation of a playlist, in accordance with exemplary embodiments of the present invention; and FIG. 15 shows computer code that is generated in response to a playlist generation request, in accordance with exemplary embodiments of the present invention

DETAILED DESCRIPTION

The present invention generally relates to systems and methods for dynamically capturing and analyzing information, such as, for example, urgent notifications, and displaying the information and other types of content on public or semi-public non-personal digital displays so that such information may be made available to viewers in real-time or near real-time while optimizing the accessibility and effectiveness of the display of such information.

For the purposes of the present disclosure, the term "real time" means at or very near the time (e.g., within 2 seconds, within 5 seconds, etc.) at which an event occurs and/or notification of the event is received.

In embodiments, the present invention seeks to address the technological problem of how to track and display information on non-personal digital displays in a dynamic manner within looped content that is otherwise pre-set. Conventionally, the manner in which content is displayed is predetermined by a network content manager, so that looped content for instance is fixed until the content is altered at some later point in time. This is problematic particularly in the case of urgent information, such as, for example urgent or emergency notifications, which need to be placed within the looped content quickly so that the public can view the information and take appropriate action as necessary.

In exemplary embodiments, the present invention addresses this technological barrier by providing a technological solution in the form of a computer system and process that gathers information regarding an event in real-time or near real-time and determines, based on a matching algorithm, which non-personal digital displays should be selected for display of the event information and to what extent the information should be displayed. In the case of looped content, the solution offered by the present invention allows for dynamic adjustment of the content displayed in the slots within the loop so that, for example, more urgent notifications can take the place of or have precedence over regular content such as looped advertising content. The present invention provides these technological advantages through a unique and detailed series of process steps and through an unconventional placement of software and/or hardware components between advertising computer systems, event notification sources, and network or non-networked non-personal digital displays.

Figure 1:
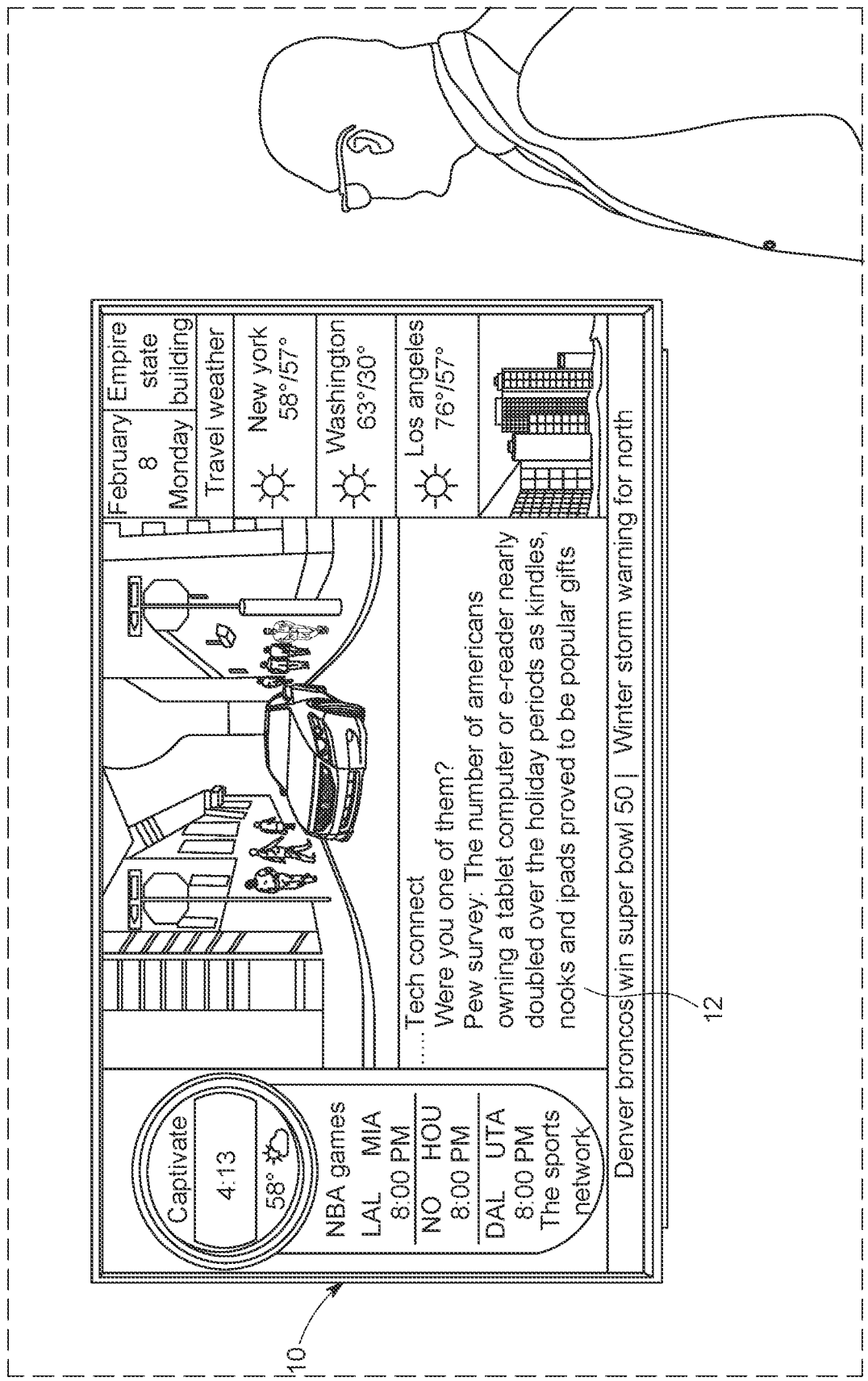
FIG. 1 illustrates an exemplary environment in accordance with exemplary embodiments of the present invention in which content is displayed on a public or semi-public non-personal digital display.

FIG. 1 illustrates an exemplary environment in accordance with the exemplary embodiments of the present invention in which digital content is displayed on a network-connected non-personal digital device 10. The digital content may include digital messages (e.g., text messages, image messages, video messages, audio-video messages and/or a combination thereof, to name a few) played automatically on the non-personal digital device 10 in accordance with a pre-defined loop that repeats within a predetermined time period. In accordance with exemplary embodiments of the present invention, at least some of the content displayed within each repeating time period is not part of the pre-set loop content. For example, such content may be externally sourced in a dynamic manner so that the content is changed in real time as events associated with the content are monitored and also tracked in real time.

By way of example, FIG. 1 illustrates digital content is displayed on a monitor 12 of non-personal digital device 10. Monitor 12 includes a screen that may be configured as a split-screen so that different types of content are displayed in each section of the screen. The middle of the screen may display advertisements (programmatic or otherwise), the sides of the screen may display general information such as, for example, date, time, and local temperature, to name a few, and/or news items such as, for example, sports scores, stock market information, and weather forecasts, to name a few. The bottom of the screen may be designated to display more recent and/or urgent information, such as, for example, recent major event information (e.g., Super Bowl and other major sporting event scores, election results, etc.) and/or public service announcements, such as, for example, traffic alerts, storm warnings, and other types of urgent information. Other configurations may also be used consistent with the spirit and scope of the present invention.

While FIG. 1 represents non-personal digital device 10 as digital signage affixed to a wall in a public or semi-public place, other non-personal network-connected digital devices and electronic displays in public and semi-public settings can also be used in accordance with exemplary embodiments of the present invention, such as the digital urban panel shown in FIGS. 2A-2C (discussed below). For example, network-connected screens on non-personal digital devices can be placed in transit stations and platforms, airports, building lobbies, elevators, on the exterior or in the interior of a motor vehicle, in retail or commercial locations such as malls, grocery stores, restaurants, movie theaters, and health clubs, on outdoor digital billboards and street signs, and/or on digital map/wayfinding displays, to name a few.

Figure 2A:
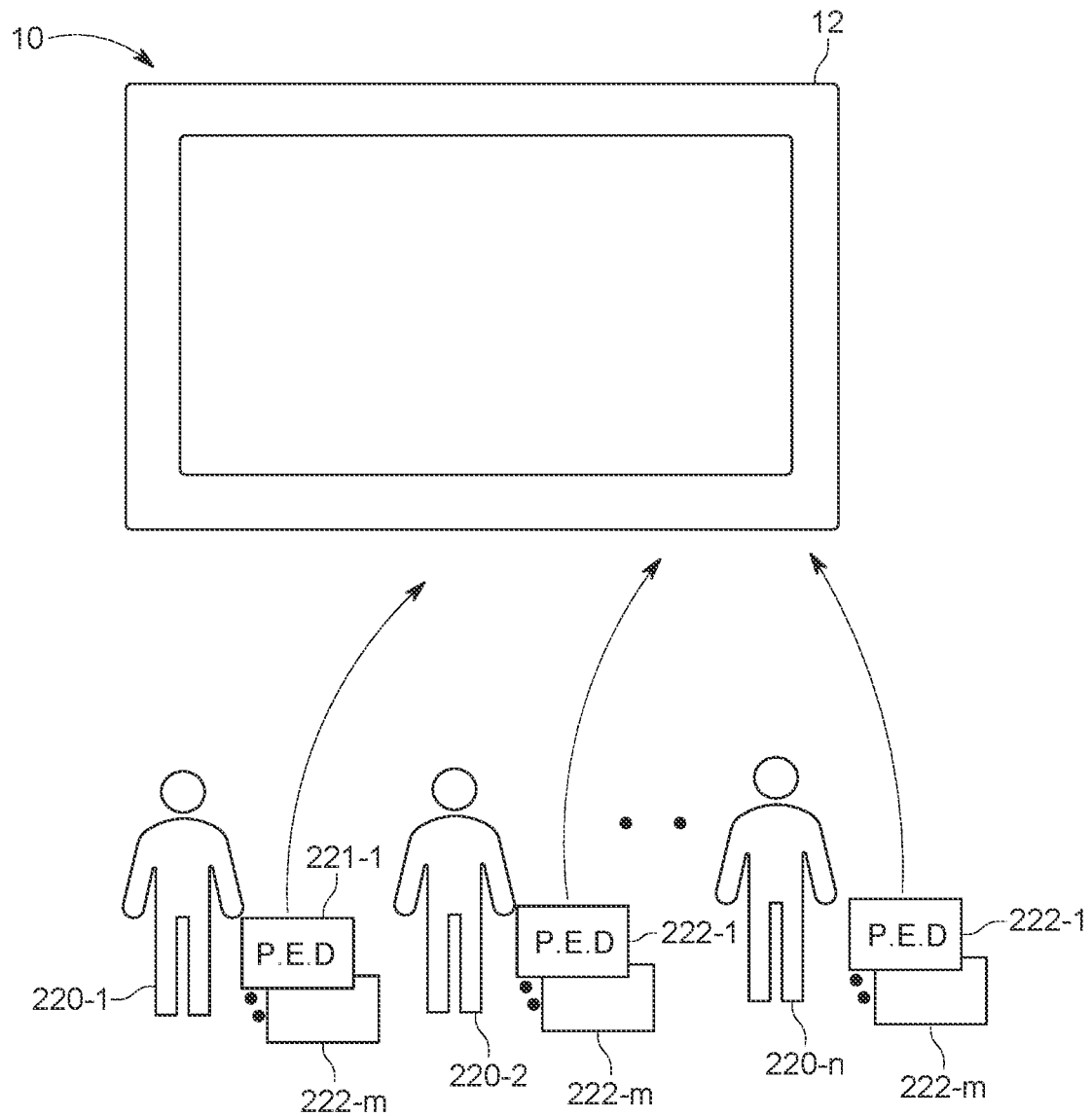
FIGS. 2A-2C show front, cross section, and top views, respectively, of an exemplary non-personal digital device that can be used in accordance with exemplary embodiments of the present invention.
Figure 2B:
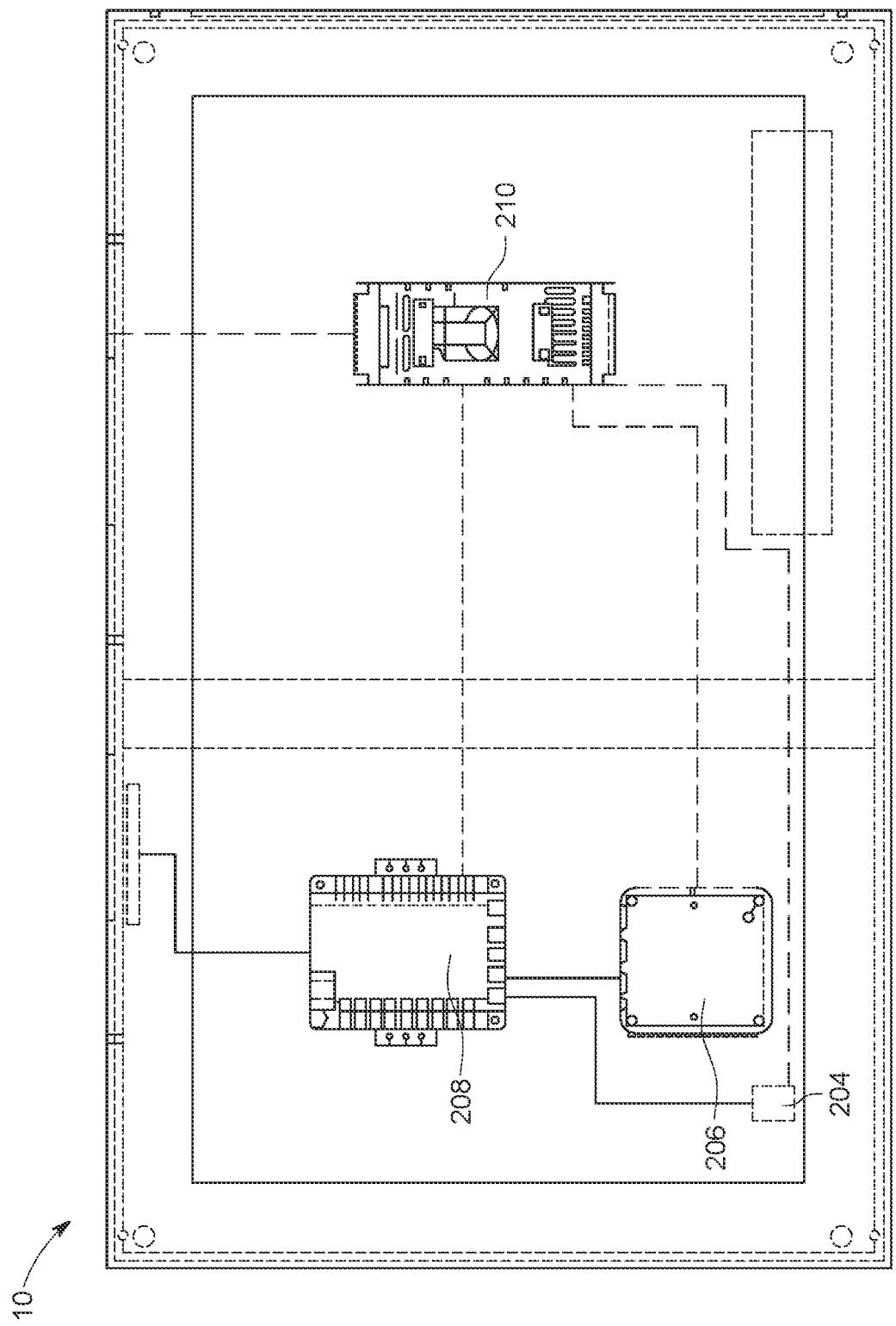
Figure 2C:
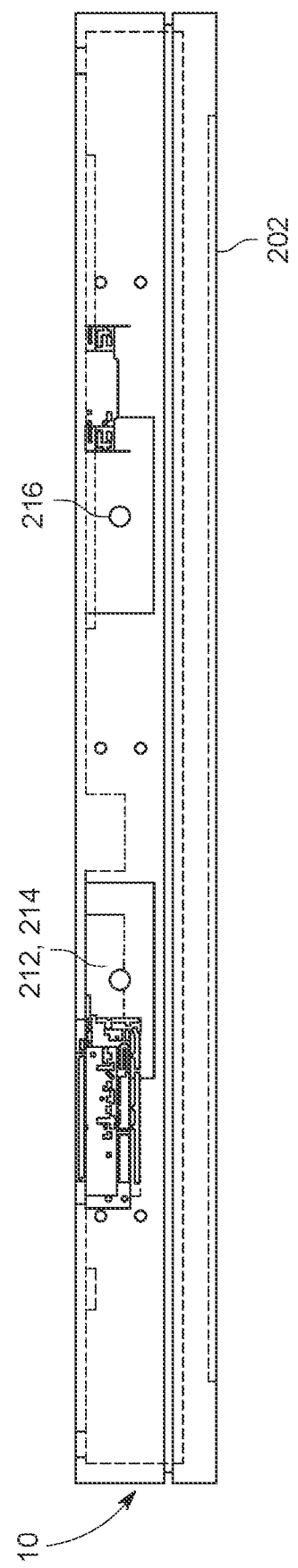

FIGS. 2A, 2B, and 2C show front, cross-section, and top views, respectively, of an exemplary non-personal digital device 10 that can be used in accordance with exemplary embodiments of the present invention. As illustrated in FIGS. 2A-2C, non-personal digital device 10 includes a monitor 12 electrically connected to LCD 202 (liquid crystal display) on which the digital advertisement may be displayed. LCD 202 is used in an exemplary manner. Other types of display circuitry may be used, such as, for example, cathode ray tubes (CRTs), light emitting diodes (LEDs), e-paper and organic light emitting diodes (OLEDs), to name a few. As shown in FIG. 2A, in embodiments, monitor 12 may be a touch screen, allowing one or more individuals 220-1, 220-2 . . . 220-n to interact with the non-personal digital device 10. Monitor 12, in embodiments, may include a resistive touch screen, a capacitive touch screen, a surface acoustic wave touch screen, an infrared touch screen, an optical imaging touch screen, or an acoustic pulse recognition touch screen, to name a few.

Non-personal digital device 10 may also include a network connection, such as network switch 208, antenna (which may be located in the antenna compartment 212 and/or accessible via the fiber knockout 214) as shown in FIGS. 2B and 2C, by way of example. Other types of network connections such as cellular modems using GPRS, EDGE, 3G, 4G LTE, low power LTE, Ethernet, token-ring, Wi-Fi, WiMAX, Bluetooth®, ZigBee, fixed-point wireless, mesh networks, GSM, GSM-R, UMTS, TD-LTE, LTE, LTE-Advanced Pro, LTE Advanced, Gigabit LTE, CDMA, iDEN, MVNO, MVNE, Satellite, TETRA, WiMAX, AMPS TDMA, Roaming SIM, DC-HSPA, HSPA, HSPA+, HSDPA, G, 2G, 3.5G, 4G, 4.5G, 5G, 5.5G, 6G, 6.5G, GNSS, EV-DO, 1xRTT, WCDMA, TDS-CDMA, CDMA2000, CSFB, FDMA, OFDMA, PDMA, AMPS, EV-DO, DECT, IS-95, NMT, UMTS, MPLS, MOCA, Broadband over Power Lines, NB-IoT, enhanced MTC (eMTC), LTE-WLAN, ISDN, Microwave, Long Range Wi-Fi, Point to Point Wi-Fi, EC-GSM-IoT, LTE-M, NB-IoT, Evolved Multicast Broadcast Multimedia Service (eMBMS) and LTE-Broadcast (LTE-B), or other data transmission technologies, to name a few, may also be used in accordance with exemplary embodiments of the present invention.

In exemplary embodiments, non-personal digital device 10 may offer other features such as an interactive screen or a display of non-advertising information, to name a few. In embodiments where non-personal digital device 10 includes a touch screen, tablet or other consumer-operated interactive capability, an event can also be tracked and linked to an individual impression when a consumer takes some action (e.g., purchasing a product) via an interactive capability on the non-personal digital device 10 and the non-personal digital device 10 sends a message to a measurement module registering the event.

By way of example, non-personal digital device 10 may further include service CPU 204, CPU 206, and power supply 210. Service CPU 204 may allow an individual or manufacturer of non-personal digital device 10 to fix or troubleshoot non-personal digital device 10. CPU 206 may include an operating system or other software that provides executable display instructions to the operatively connected LCD 202. Service CPU 204 and CPU 206 may include: one or more processors, memory circuitry (including RAM and/or ROM), a display (which may be similar to LCD 202), communications circuitry, input circuitry, and/or output circuitry, to name a few. The components of non-personal digital device 10 (e.g., monitor 12, network switch 208, service CPU 204, CPU 206, etc.) may be electronically and/or operatively connected to the power supply 210 (which may be accessible via power knockout 216).

As shown in FIG. 2A, at any given period in time, an individual 220-1 . . . 220-n, who may possess one or more personal electronic devices 222-1 . . . 222-m such as, mobile computers (e.g., laptops, Ultrabooks™), desktop computers, mobile phones, smart phones, tablets, personal display devices, personal digital assistants ("PDAs"), gaming consoles and/or devices, smart vehicles (e.g., cars, trucks, motorcycles, etc.), and/or wearable devices (e.g., watches, pins/broaches, headphones, etc.), to name a few, may take some action (e.g., visit a website, download an application, purchase a product, etc.) related to a product or service promoted in the digital advertisement being displayed on the non-personal digital device 10. In accordance with exemplary embodiments, a programmatic module (either third-party or otherwise) may be used to link other forms of digital advertising (e.g., online, mobile, social, etc.) with digital advertising on the non-personal digital device 10. Examples of such programmatic modules are described in U.S. patent application Ser. Nos. 16/054,516 and 16/353,550 (now U.S. Pat. No. 10,504,158), the contents of which are incorporated herein by reference in their entirety. The programmatic module allows digital ad buying systems (e.g., "demand side platforms", "DSPs", "ad servers" or "bidders") to purchase the opportunity to display a digital advertisement on a non-personal digital device in a public or semi-public setting, using an adaptation of electronic bidding that enables the platforms to track and measure the exposure to individual consumers ("individual impressions") associated with the display of that advertisement, and also enables an array of operations within the digital ad buying system or other integrated measurement platforms, including, e.g., planning, reporting, attribution, analytics, and campaign optimization.

Figure 3:
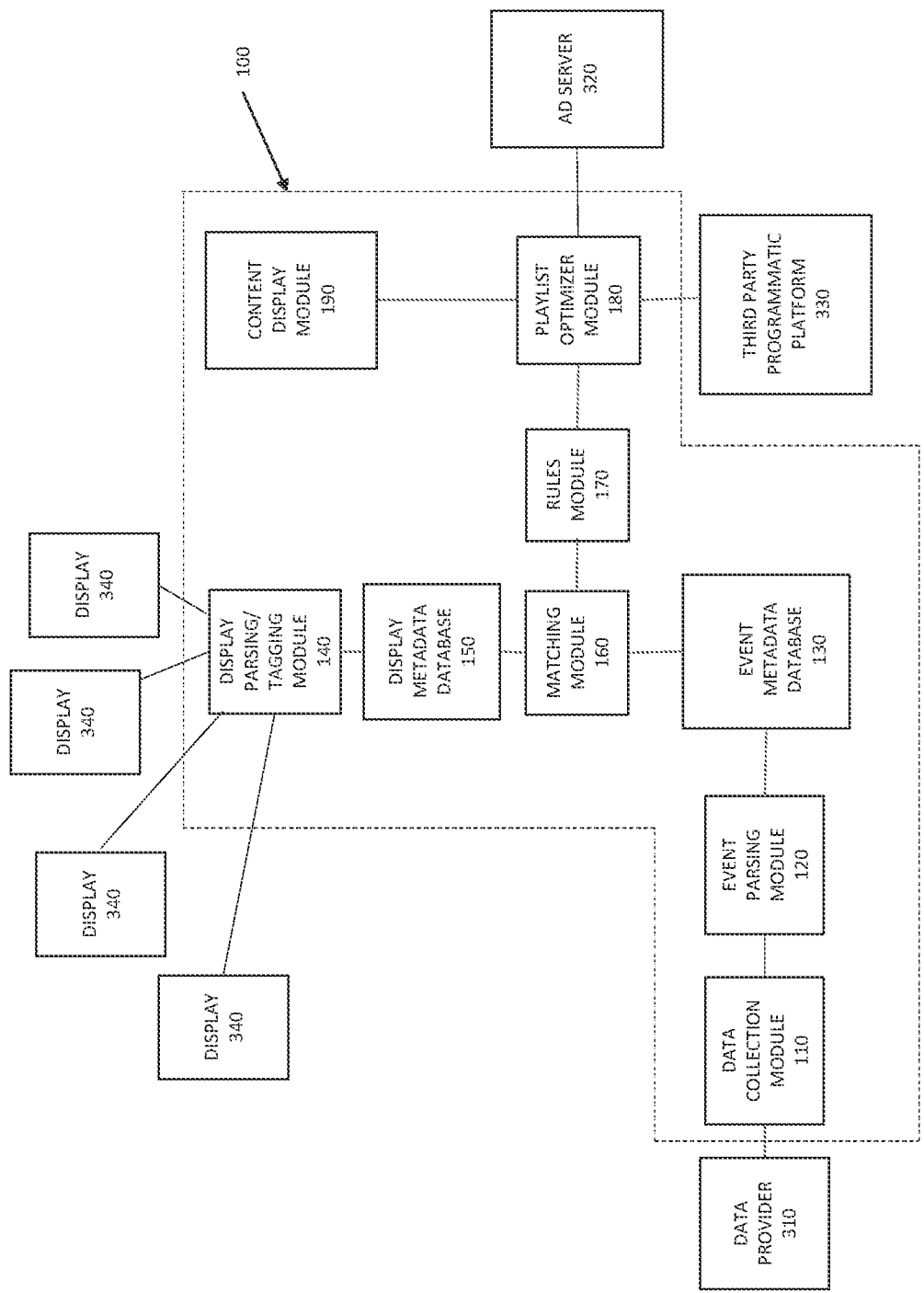
FIG. 3 illustrates an exemplary configuration of participant systems and platforms in accordance with exemplary embodiments of the present invention.

FIG. 3 illustrates an exemplary configuration of participant systems and platforms in accordance with exemplary embodiments of the present invention. It will be appreciated that each of the devices, systems and platforms illustrated in FIG. 3 are represented as a single unit but may be comprised of one or more units or may be parts of a larger aggregated unit that performs multiple functions.

As illustrated in FIG. 3, components of the computer system in accordance with exemplary embodiments may include a data collection module 110, an event parsing module 120, an event metadata database 130, a display parsing/tagging module 140, a display metadata database 150, a matching module 160, a rules module 170, a playlist optimizer module 180, and a content display module 190. These components may be connected either directly, indirectly and/or through a network connection (such as the Internet, a near field wireless connection, a cellular network connection, or a wireless local area network) and interact (also either directly, indirectly and/or via wired network and/or wireless near field and/or cellular connections) with other devices, systems and platforms within an operating environment to carry out the various aspects of the present invention. For example, the operating environment may include a data provider 310, an ad server 320, a third-party programmatic platform 330, and digital displays 340, to name a few. Although data collection module 110, event parsing module 120, event metadata database 130, display parsing/tagging module 140, display metadata database 150, matching module 160, rules module 170, playlist optimizer module 180, and content display module 190 are shown as separate components, it should be appreciated that these components may be incorporated into modules of one or more components, or may be embodied in a single component having all of the functionality of these components. Further, it should be appreciated that these components may be associated with a computer-readable medium coupled to one or more data processing apparatus having instructions stored thereon which, when executed by the one or more data processing apparatus, cause the one or more data processing apparatus to perform the processes described herein. As shown by the dashed-line outline in FIG. 3, data collection module 110, event parsing module 120, event metadata database 130, display parsing/tagging module 140, display metadata database 150, matching module 160, rules module 170, playlist optimizer module 180, and content display module 190 may be collectively referred to herein as playlist optimizer system 100. In embodiments, playlist optimizer system 100 may have less than each of these modules, and/or may include other modules not shown in FIG. 3.

Figure 4:
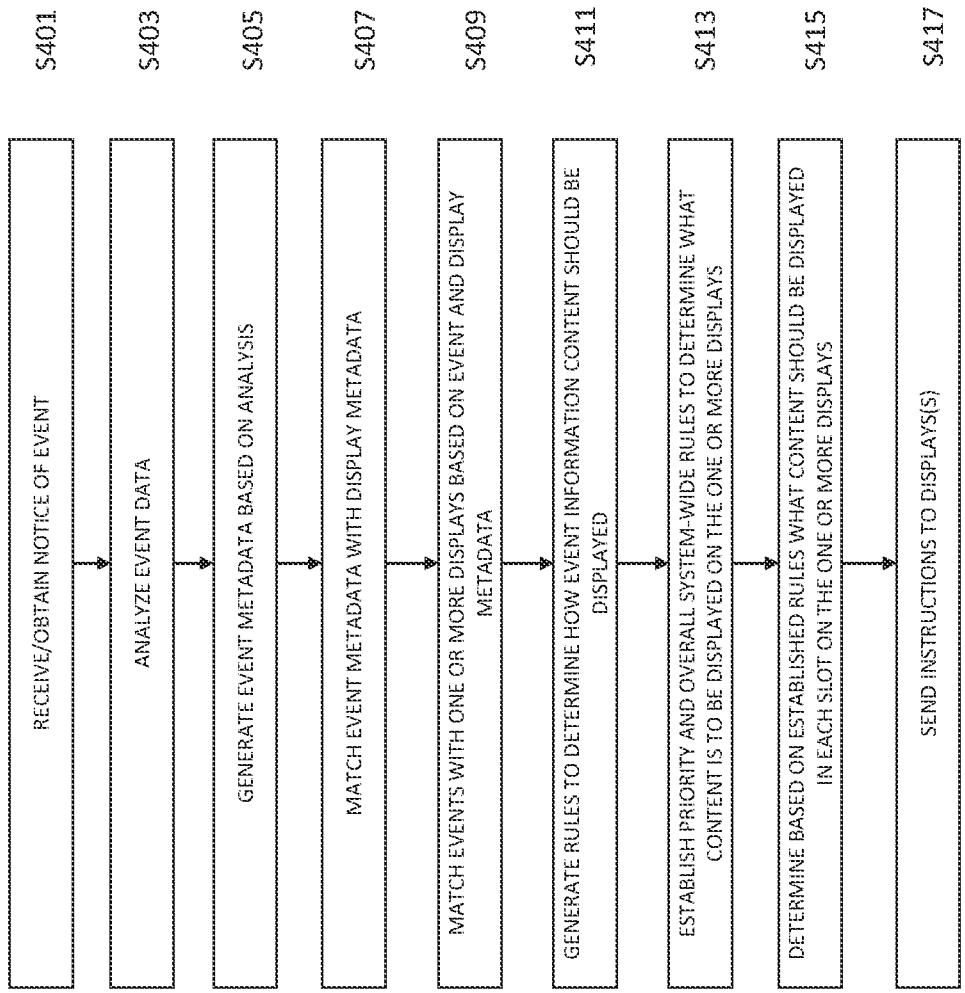
FIG. 4 is a flow chart showing a process for dynamically capturing and analyzing information and displaying the information at one or more public or semi-public non-personal digital displays according to an exemplary embodiment of the present invention.

FIG. 4 illustrates the general process flow of a method according to an exemplary embodiment of the present invention. In Step S401 of the method, data collection module 110 receives or otherwise obtains notice of an event. For the purposes of the present disclosure, the term "event" relates to an incident in the real world that occurred in the past, is occurring in the present moment or will occur or predicted to occur sometime in the future, such as, for example, an emergency, a weather event, a public transportation notice such as a service change to a train line or a gate change, an amber alert, and/or an incident that the public should be urgently made aware of, to name a few. The data collection module 110 may receive or otherwise obtain notice of an event through integration with the third-party data provider 310 (e.g., a weather API, a transit system's emergency management software, to name a few), by direct input from an operator, or otherwise. In exemplary embodiments, the data collection module 110 may access one or more third-party data providers 310 on a periodic or aperiodic basis to collect event notices or such notice may be pushed from one or more third-party data providers 310. In exemplary embodiments, a user may log into a web-based portal to notify the system 100 of an event. In other embodiments, the user may log into a mobile application or a desktop or laptop computer user interface. In exemplary embodiments, the event notification may include event information data and may be in a parsable format, such as, for example, SQL or XML.

In step S403 of the process, event parsing module 120 analyzes data corresponding to the event to determine information about that event. Such information may include, for example, event severity, event location, and event timing, to name a few. Event parsing module 120 may perform this analysis by determining the relevant information based on the event information data provided in parsable format. In embodiments, one or more conditions associated with the information about the event may be included in the event in a separate data field.

In step S405 of the process, event metadata is generated based on the event information determined by the analysis in step S403 and collected and stored in event metadata database 130. In exemplary embodiments, event metadata database 130 may be a structured database of attributes associated with each event. For example, event metadata database 130 may be a searchable database of records, with each record made up of fields that define the record. Each record may include fields such as, for example, an event severity field (e.g., high severity, medium severity, low severity), an event location field (e.g., zip code, state, area code, country, etc.), and an event timing field (e.g., current, future, a specific time, etc.), to name a few. According to embodiments, the metadata can be generated based on a machine learning algorithm or a heuristic analysis of the event information. For example, in embodiments, the process can determine, based on analysis of the event information, that certain weather conditions (e.g., high winds and flooding) should be classified as "high severity," while other weather conditions (e.g., clear skies with light winds) should be classified as "low severity."

Figure 5:
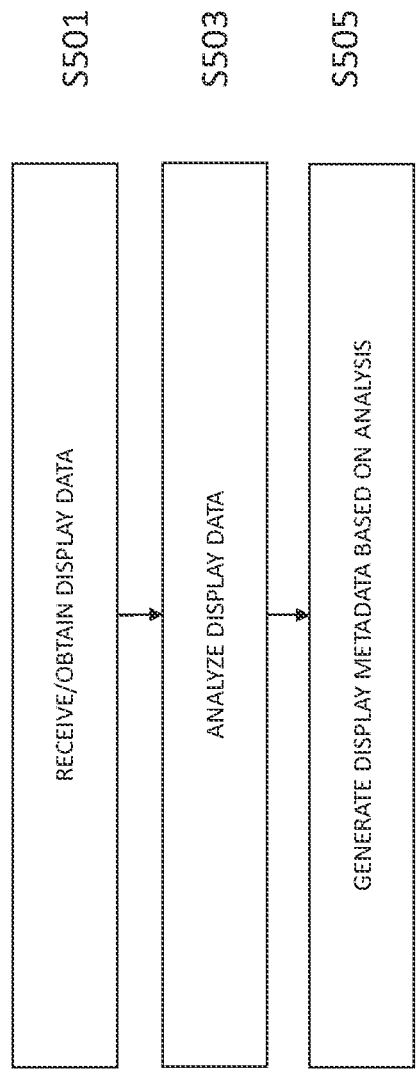
FIG. 5 is a flow chart showing a process for analyzing display data and generating display metadata according to an exemplary embodiment of the present invention.

In step S407 of the process, the event metadata is matched with display metadata. In this regard, FIG. 5 illustrates the general process flow of a method for generating display metadata according to an exemplary embodiment of the present invention. In step S501 of the method, display parsing/tagging module 140 receives and/or obtains display data associated with information pertaining to one or more displays 340, where each display 340 may or may not be part of a network of displays. Displays 340 can be the same type of display or can vary from one another regarding, for example, function (e.g., interactive or non-interactive), size, manufacturer, and/or other components (e.g., charger station, Wi-Fi, etc.) to name a few. Displays 340 may or may not be integrated with the system 100 (e.g., installed with and operated by the system 100). In embodiments, displays 340 can be remote from and operatively connected to system 100. In embodiments, displays 340 can be operatively connected to system 100 as well as other systems independent of system 100.

In step S503, display parsing/tagging module 140 analyzes the display data to determine key pieces of information about the displays 340. In this regard, in exemplary embodiments, display metadata database 150 may be (i) integrated with an existing third-party asset management database (e.g., SiteTracker), (ii) a stand-alone database of display metadata, and/or (iii) a combination thereof to name a few. In embodiments, at least some information about each display may be collected automatically by parsing a third-party database and/or by referencing tags within one or more of the displays 340 that indicate certain display attributes. In this regard, one or more of the displays 340 may be manually tagged with display attributes such as, e.g., location and physical display attributes, to name a few. Examples of location attributes include, latitude/longitude, zip code, transit information (e.g., what station/stop the display is at, which transit lines/routes are associated with each display), interior location information (e.g., the location of the display inside a broader interior location, floor on which the display is located), and proximity (e.g., objects or locations that are near the display), to name a few. Examples of physical display attributes include an indication of whether the display screen is interactive or non-interactive screen, size of the screen, display manufacturer, and/or other functionality (e.g., charger station, Wi-Fi, etc.), to name a few.

In step S505, display parsing/tagging module 140 may generate display metadata based on the analysis performed in step S503. In embodiments, the display metadata may include display data that was parsed from third-party databases and/or obtained from tagged displays, such as, for example, the display location and display physical attributes discussed above. In exemplary embodiments, the display metadata is collected and stored in display metadata database 150. In exemplary embodiments, display metadata database 150 may be a structured database of attributes associated with each display 340. For example, display metadata database 150 may be a searchable database of records, with each record made up of fields that define the record. Each record may include fields such as, for example, a display location field and a display physical attribute field, to name a few. In embodiments, display metadata database 150 may include one or more databases that are operatively connected to display parsing/tagging module 140.

Returning to FIG. 4, in step S409, matching module 160 matches events with one or more of the displays 340 based on the extracted event metadata and display metadata. For example, an event notifying riders of a station closure would be matched with all the displays associated with that station, such as, for example, displays located at or in proximity to the station, displays that have physical attributes that allow them to display certain information pertaining to the closure, and/or displays located at or in proximity to a specific location within the station. In this step, matching module 160 may parse the information pertaining to a particular event from event metadata database 130 and match the parsed event metadata with display metadata parsed from display metadata database 150. The matching algorithm may search for a direct match (e.g., display location directly correlates with event location) and/or for a proximity match (e.g., display location is within a specified distance from the event location) and/or some combination of direct and proximity matching, to name a few. In embodiments, other matching algorithms may be used without departing from the spirit and scope of the present invention.

In embodiments, matching module 160 may implement a "tag walking" function to match events with one or more of the displays 340. A "tag walk" defines how each of the entities (e.g., displays, events, and content, to name a few) are related to other entities. In embodiments, a hierarchy of object tags may be taken into account to associate with other object tags and expand the sphere of influence. From displays, the tag walker may capture applicable events, content that is related to the event, along with other metadata (such as weights and levels) that define how often the events and content can be included in a playlist. In embodiments, for events and content, the tag walker may capture all displays on which the corresponding event or content can be shown.

In addition, some object tags associated with a display can be considered time sensitive or relevant to a specific request. The tag walker may account for this and make certain alerts and content items conditionally available for a playlist.

In step S411, the rules module 170 generates a series of event display rules that establish how and which information pertaining to one or more events that are relevant to the particular time period should be displayed on one or more of the displays 340. Such rules may pertain to, for example, what event information should be displayed on one or more screens, which displays should the event information be displayed on, when should the event information be displayed, and at what frequency should the event information be displayed, to name a few. The event display rules may be determined based on the matching results obtained in step S407 so that, for example, rules are generated that establish the displays that are relevant to an event in terms of location and physical attributes. As an example, rules module 170 may establish rules that set information to be displayed on a screen that is different from information displayed on other screens depending on the location of those screens relative to an event (e.g., "Please proceed north", "Please proceed south") and/or the physical attributes of the screens (e.g., smaller screens may display an abbreviated version of the event information, screens having interactive capability may provide a map or other additional information based on user-interaction). As another example, rules module 170 may establish frequency of displaying the event information based on the event severity field in event metadata database 130, so that information pertaining to high severity events are displayed more frequently than information pertaining to low severity events.

In step S413, in embodiments, playlist optimizer module 180 may establish a set of priority and overall system-wide rules that ultimately determine what is seen on each screen at any moment in time. In this regard, in embodiments, playlist optimizer module 180 may reference the event display rules as well as rules from other sources that also may want to display content and advertising on that network of displays. Examples of these other sources include, for example, an advertising server 320 (e.g., Broadsign) or a third-party programmatic platform 330 (e.g., PlaceExchange), to name a few. In embodiments, playlist optimizer module 180 may be ultimately responsible for deciding, in real time, what should be displayed, even when it has competing requests and rules from multiple inputs. For a specific request, in embodiments, the content service may take into account the display, conditional tags, and eligible events/content items and selects the most relevant to be shown in a particular time slot. The request can be for a single time slot or multiple time slots during a loop. In embodiments, the request can be for different time slots across multiple loops. It will provide all the metadata as part of the response associated with that item (alert/content). An example of a playlist request is depicted in FIG. 14.

For example, in embodiments, playlist optimizer module 180 integrates with multiple services, such as multiple types of content services, advertising providers, to name a few. In embodiments, for requests it is servicing, playlist optimizer module 180 may reach out in real time to one or more other relevant services and translate request level tags to the corresponding services, receives or otherwise obtains responses, and decides which response to use for each of the slots. This results in a playlist with items seamlessly integrated from multiple services that consumers of a playlist optimizer API can use to render content on the display. An example playlist response is depicted in FIG. 15.

In step S415, in embodiments, content display module 190 may determine based on the rules established by the playlist optimizer module 180 what content to display within each slot within each loop. For example, if a high severity event has occurred, rules may have been established to display the event information continuously within a display area on each screen, while other looped content is displayed in other display areas of the screen. In contrast, viewers may not need to urgently know about less severe events, in which case the event information may not be continuously displayed but instead may be slotted into the loop along with the other looped content. In exemplary embodiments, this step results in generation of instructions for one or more of the displays 340 that sets the looped content. For example, content display module 190 may generate instructions regarding how and when the event information should be displayed within the content loop.

In step S417, display instructions are then sent to one or more of the displays 340 as directed by the content display module 190.

In exemplary embodiments the system 100 may iterate through the overall process (steps S401 through steps S415) at a predetermined time frequency (e.g., every 7.5 seconds, every 10 seconds, to name a few) so that looped content may dynamically change as events occur in real time.

Example

Event—System 100 integrates its decision engine with a transit system's emergency messaging system, via an API provided by the emergency messaging system. That API provides notice of a fire on a train platform.

Event Parsing—Event parsing module 120 parses the alert for key information, including severity, location, and timing.

Event Metadata—The results of the event parsing establish that the event is: i) a level 5 alert (the highest level), ii) at the Chicago Transit Authority's (CTA) Clark/Lake Station, and iii) the emergency is happening right now. This information is then stored in event metadata database 130.

Displays—System 100 operates a network of thousands of digital displays across the world.

Display Parsing/Tagging—System 100 uses SiteTracker, a third-party asset management software, which contains a database of every display operated by system 100 with associated attributes for each screen. System 100 is integrated with an API provided by SiteTracker.

Display Metadata—System 100 has a structured database of attributes associated with every possible display that could be targeted with advertising/messaging.

Matching—Matching module 160 matches the alert from the CTA to all screens associated with the CTA's Clark/Lake Station.

Event Display Rules—Given that this is i) a level 5 alert and ii) is happening right now, rules module 170 generates a rule to display the emergency alert immediately on all screens at the Clark/Lake Station for the next 30 minutes.

Playlist Optimization—Playlist optimizer module 180 receives or otherwise obtains the event display rule from rules module 170 and also receives or otherwise obtains a rule from Broadsign, system 100's advertising server, to display an advertisement for Coca-Cola on all screens at the CTA's Clark/Lake Station. Given rules pre-defined in playlist optimizer module 180, a Level 5 alert takes precedence over anything from Broadsign. As a result, playlist optimizer 180 chooses to display the alert.

Content/Advertising Display—Content display module 190 generates instructions to display the alert on the appropriate screens.

Figure 6:
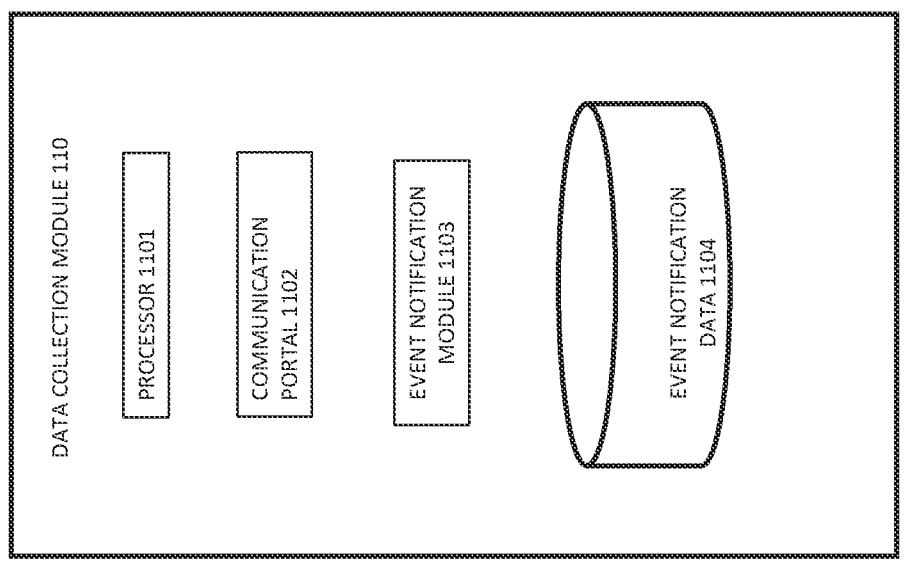
FIG. 6 is a representative block diagram of a data collection module in accordance with exemplary embodiments of the present invention.

In embodiments, data collection module 110 may include computer hardware and/or software components that are configured to receive or otherwise obtain notice of an event through integration with a third-party data provider (e.g., a weather API, a transit system's emergency management software, etc.) or by direct input from an operator. As shown in FIG. 6, the data collection module 110 may include one or more processors 1101 and a communication portal 1102 (e.g., for sending and/or receiving data). The one or more processors 1101 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. Data collection module 110 can also include non-transitory computer-readable memory with one or more databases and data stored thereon. The memory may comprise electronic memories such as random-access memory (RAM), read-only memory (ROM), or other types of memory, in any combination. Data stored on the memory can include, for example, event notification data 1104. One or more software modules may be stored in the memory and running or configured to run on the one or more processors 1101. Such modules can include a static event notification module 1103. The processes performed by such modules, the data produced thereby and/or the data accessed thereby are described herein.

In exemplary embodiments, event notification module 1103 may access one or more third-party data providers on a periodic or aperiodic basis to collect event notices or such notice may be pushed to event notification module 1103 from one or more third-party data providers. In exemplary embodiments, a user may log into communication portal 1102 and notify event notification module 1103 of an event. In exemplary embodiments, the event notification may include event information data and may be in a parsable format, such as, for example, SQL or XML. According to embodiments, data related to the event notification is stored as event notification data 1104. This data is then used by event parsing module 120.

Figure 7:
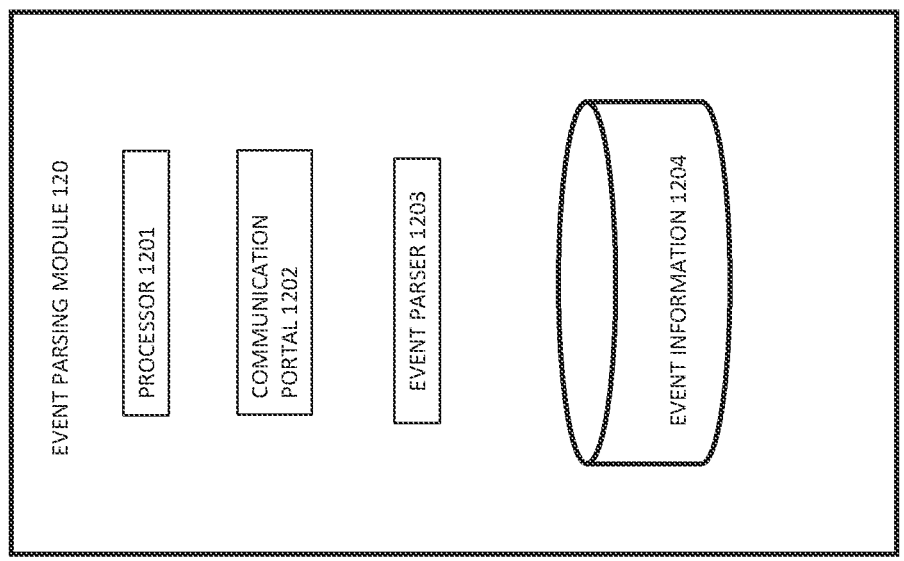
FIG. 7 is a representative block diagram of an event parsing module in accordance with exemplary embodiments of the present invention.

In embodiments, event parsing module 120 may include computer hardware and/or software components that are configured to analyze data corresponding to an event to determine information about that event. Such information may include, for example, event severity, event location, and event timing, to name a few. As shown in FIG. 7, event parsing module 120 may include one or more processors 1201 and a communication portal 1202 (e.g., for sending and/or receiving data). The one or more processors 1201 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. Event parsing module 120 can also include non-transitory computer-readable memory with one or more databases and data stored thereon. The memory may comprise electronic memories such as random-access memory (RAM), read-only memory (ROM), or other types of memory, in any combination. Data stored on the memory can include, for example, event information 1204. One or more software modules may be stored in the memory and running or configured to run on the one or more processors 1201. Such modules can include an event parser module 1203. The processes performed by such modules, the data produced thereby and/or the data accessed thereby are described herein.

Event parsing module 120, via event parser 1203, may analyze event notification data received or otherwise obtained from data collection module 110. In embodiments, event parsing module 120 creates an event (i.e., an alert) based on the event notification data received or otherwise obtained from data collection module 110. In embodiments, event parsing module 120 creates the event automatically based on event notification data received or otherwise obtained from data collection module 110. In embodiments, an end user accesses event parsing module 120 and populates an even template with required fields to create an event. The event created by event parsing module 120 is associated with tags that are also associated with one or more displays 340, as described below in connection with display parsing/tagging module 140. Once the event notification data is analyzed, event parsing module 120 stores the results of the analysis as event information 104.

Figure 8:
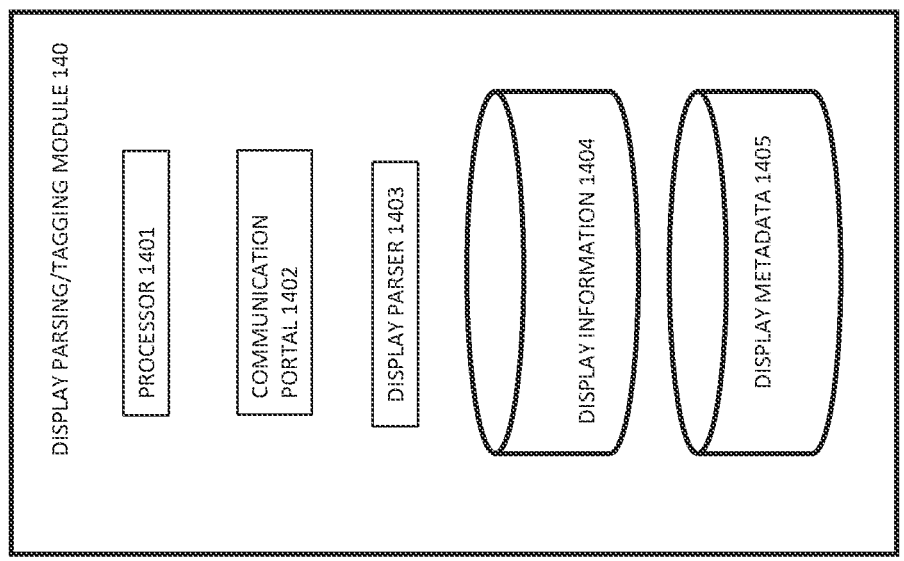
FIG. 8 is a representative block diagram of a display parsing/tagging module in accordance with exemplary embodiments of the present invention.

In embodiments, display parsing/tagging module 140 may include computer hardware and/or software components that are configured to analyze display data to determine key pieces of information about displays, such as displays 340 in FIG. 3. As shown in FIG. 8, display parsing/tagging module 140 may include one or more processors 1401 and a communication portal 1402 (e.g., for sending and/or receiving data). The one or more processors 1401 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. Display parsing/tagging module 140 can also include non-transitory computer-readable memory with one or more databases and data stored thereon. The memory may comprise electronic memories such as random-access memory (RAM), read-only memory (ROM), or other types of memory, in any combination. Data stored on the memory can include, for example, display information 1404. One or more software modules may be stored in the memory and running or configured to run on the one or more processors 1401. Such modules can include a display parser module 1403. The processes performed by such modules, the data produced thereby and/or the data accessed thereby are described herein.

Display parsing/tagging module 140 receives and/or obtains display data associated with information pertaining to one or more displays 340 via communication portal 1402. Display parsing/tagging module 140, via display parser 1403, analyzes the display data to determine key pieces of information about the displays 340. Display parser 1403 may analyze information about each display. This display information may be stored in display information 1404 and may be collected automatically by parsing a third-party database and/or by referencing tags within one or more of the displays 340 that indicate certain display attributes. In some embodiments, the display information is collected through a user interface that allows an end user to associate tags with display attributes. In this regard, one or more of the displays 340 may be tagged with display attributes such as, for example, location and physical display attributes, to name a few. Examples of location attributes include, latitude/longitude, transit information (e.g., what station/stop the display is at, which transit lines/routes are associated with each display), interior location information (e.g., the location of the display inside a broader interior location, floor on which the display is located), and proximity (e.g., objects or locations that are near the display), to name a few. Examples of tags would thus be "Station," "Route," and "Stop," and each tag would be associated with a certain attribute, such as station name, route name, and stop location. Examples of physical display attributes include an indication of whether the display screen is interactive or non-interactive screen, size of the screen, and display manufacturer, to name a few. An example of a display object that is tagged with two attributes (stations) is shown in FIG. 10.

In embodiments, an event object may also be tagged by display parsing/tagging module 140. An example of an event object that is tagged with two attributes (a station and a route) is shown in FIG. 11. This tagging of an event object enables the event to be associated with one or more displays that are similarly tagged.

Furthermore, in embodiments, display parsing/tagging module 140 may also tag content objects. An example of a content object that is tagged with two transportation type modes (i.e., bus and subway) is depicted in FIG. 12. As with event objects and display objects, the tagging of a content object enables the content to be associated with one or more displays that are similarly tagged.

Once all of the tags in display, event, and content objects have been resolved, then, in embodiments, display parsing/tagging module 140 may associate the tags within a display object, which will define the events and/or content that can be used in a playlist on the displays that are mapped to that object. An example of a display object is depicted in FIG. 13. FIG. 13 associates with corresponding displays different alert (event) ids, content ids, stop ids, route ids, mode ids, station ids, and map ids. This defines a mapping of different alerts and contents that can be shown on displays that map to the object.

In embodiments, display parsing/tagging module 140, via display parser 1403, may generate display metadata based on the analysis of display information 1404. The display metadata may include display data that was parsed from third-party databases and/or obtained from tagged displays, such as, for example, the display location and display physical attributes discussed above. In exemplary embodiments, the displays metadata is collected and stored in display metadata database 150, as shown in FIG. 3. As mentioned earlier, in exemplary embodiments, display metadata database 150 may be a structured database of attributes associated with each display 340. For example, display metadata database 150 may be a searchable database of records, with each record made up of fields that define the record. Each record may include fields such as, for example, a display location field and a display physical attribute field, to name a few.

Figure 9:
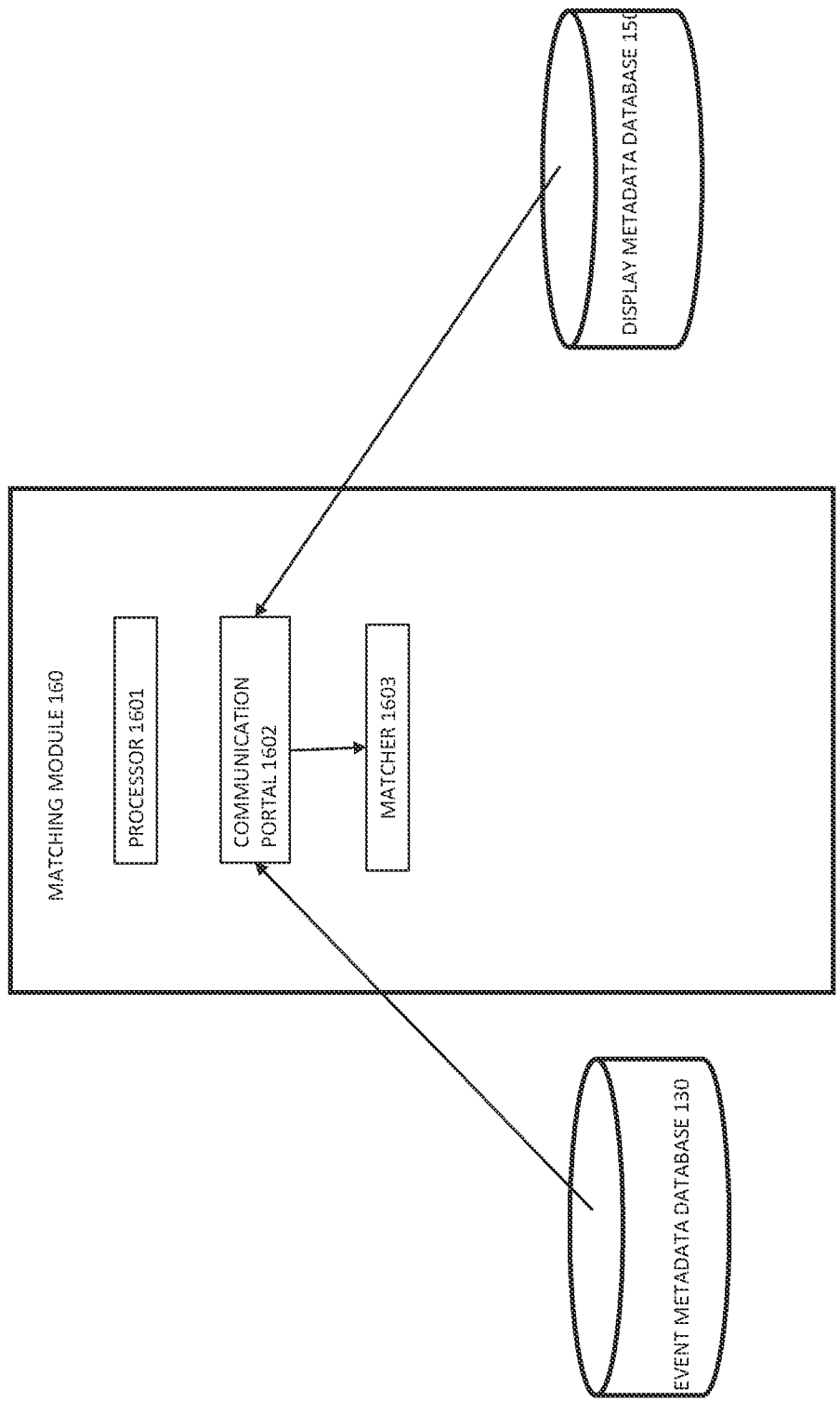
FIG. 9 is a representative block diagram of a matching module in accordance with exemplary embodiments of the present invention.

In embodiments, matching module 160 may include computer hardware and/or software components that are configured to match events with one or more displays 340 based on extracted event metadata and display metadata. As shown in FIG. 9, matching module 160 may include one or more processors 1601 and a communication portal 1602 (e.g., for sending and/or receiving data). The one or more processors 1601 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. Matching module 160 can also include non-transitory computer-readable memory with one or more databases and data stored thereon. The memory may comprise electronic memories such as random-access memory (RAM), read-only memory (ROM), or other types of memory, in any combination. One or more software modules may be stored in the memory and running or configured to run on the one or more processors 1601. Such modules can include a matcher 1603. The processes performed by such modules, the data produced thereby and/or the data accessed thereby are described herein.

Matching module 160 matches events with one or more of the displays 340 based on the extracted event metadata and display metadata. Matching module 16,0 via matcher 1603 may parse the information pertaining to a particular event from event metadata database 130 and match the parsed event metadata with display metadata parsed from display metadata database 150. The matching algorithm may search for a direct match (e.g., display location directly correlates with event location) or for a proximity match (e.g., display location is within a specified distance from the event location) or some combination of direct and proximity matching.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising:
   (a) receiving or obtaining, at one or more computers, a notification of an event, the notification comprising event information data;
   (b) analyzing, by the one or more computers, the notification to determine event metadata based on the event information data, the analyzing step comprising:
      1) extracting, by the one or more computers, the event information data from the notification;
      2) analyzing, by the one or more computers, the event information data to determine one or more event attributes, the event attributes comprising at least a severity attribute;
      3) generating, by the one or more computers, the event metadata corresponding to the event attributes, wherein the event metadata comprises a first plurality of searchable database records, each record in the first plurality of database records comprising a plurality of fields that each stores an event attribute;
   (c) storing, by the one or more computers, the event metadata as database records in a first database;
   (d) receiving or obtaining, at the one or more computers, display data corresponding to one or more non-personal digital displays;
   (e) analyzing, by the one or more computers, the display data to determine display metadata corresponding to the one or more non-personal digital displays, the step of analyzing comprising at least one of:
      1) parsing, by the one or more computers, a third-party asset management database to determine one or more display attributes;
      2) referencing, by the one or more computers, one or more tags disposed at the one or more non-personal digital displays to determine one or more display attributes; and
      3) generating, by the one or more computers, the display metadata based on the one or more display attributes, wherein the display metadata comprises a second plurality of searchable database records, each record in the second plurality of database records comprising a second plurality of fields that each stores a display attribute;
   (f) storing, by the one or more computers, the display metadata as database records in a second database;
   (g) selecting, by the one or more computers, at least one non-personal digital display for display of the event notification data, the step of selecting comprising:
      1) comparing, by the one or more computers, the display metadata with the event metadata, wherein the comparing comprises:
         i. selecting from the first database, at least one event attribute from at least one of the first plurality of fields in at least one of the first plurality of database records;
         ii. selecting, from the second database, based on the at least one event attribute, at least one corresponding display attribute stored in at least one of the second plurality of fields in the second plurality of database records; and
         iii. determining that the at least one corresponding display attribute at least partially matches the at least one selected event attribute based at least on proximity data associated with the at least one event attribute and at least one corresponding display attribute;
   2) selecting, by the one or more computers, for display of the event notification data, based on the comparison, at least one non-personal digital display having at least one corresponding display attribute that at least partially matches with at least one of the selected event attributes;
(h) generating, by the one or more computers, event display rules associated with display of the event notification data at the selected at least one non-personal digital display;
(i) generating, by the one or more computers, display rules associated with display of content on the one or more non-personal digital displays, the display rules comprising at least the event display rules;
(j) determining, by the one or more computers, based on the event display rules, content to be displayed at each of the one or more non-personal digital displays; and
(k) generating, by the one or more computers, instructions for display of the content at each of the one or more non-personal digital displays based on the event display rules,
wherein the content is looped content, such that the generating in step (k) results in display of the event notification data on at least one of the non-personal digital displays within the looped content in a dynamic manner.

2. The method of claim 1, wherein the looped content further comprises an advertising slot.

3. The method of claim 2, wherein the advertising slot comprises programmatic advertising.

4. The method of claim 1, wherein steps (a) through (k) are performed on a periodic basis.

5. The method of claim 4, wherein the periodic basis is less than 5 seconds.

6. The method of claim 1, wherein the step of receiving or obtaining a notification of an event comprises integrating with a third-party data provider.

7. The method of claim 5, wherein the step of integrating comprises accessing the third-party data provider though an application programming interface.

8. The method of claim 1, wherein the one or more event attributes further comprises at least one of an event location attribute and an event time attribute.

9. The method of claim 1, wherein the first database is a structured database.

10. The method of claim 1, wherein the one or more non-personal digital displays are in a common network.

11. The method of claim 1, wherein the one or more display attributes comprises at least one of a display location attribute and a physical display attribute.

12. The method of claim 1, wherein the second database is a structured database.

13. The method of claim 1, wherein the event display rules comprise one or more of the following:
   1) what event notification data should be displayed on one or more screens of the one or more non-personal digital displays;
   2) which non-personal digital displays should the event be displayed on;
   3) when should the event notification data be displayed; and
   4) at what frequency should the event notification data be displayed.

14. The method of claim 1, wherein the step of generating, by the one or more computers, display rules associated with display of content on the one or more non-personal digital displays comprises at least one of receiving or obtaining display rules from a third-party source computer system.

15. The method of claim 14, wherein the third-party source computer system is an advertising server.

16. The method of claim 14, wherein the third-party source computer system is third-party programmatic platform.

* * * * *